S. SCHULHOFF.
PROJECTION APPARATUS.
APPLICATION FILED FEB. 20, 1912.
1,070,992.
Patented Aug. 19, 1913.
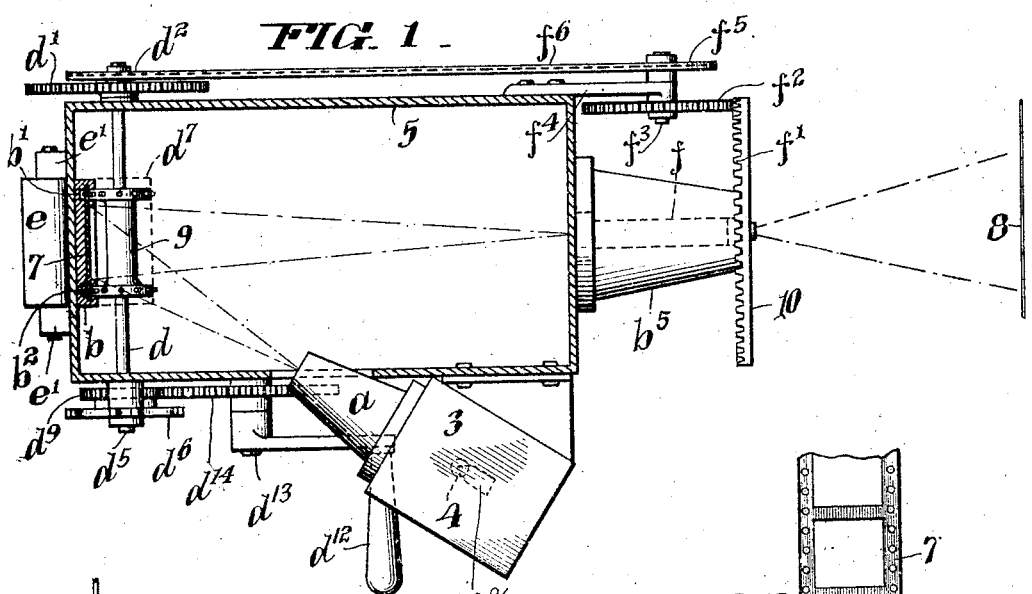
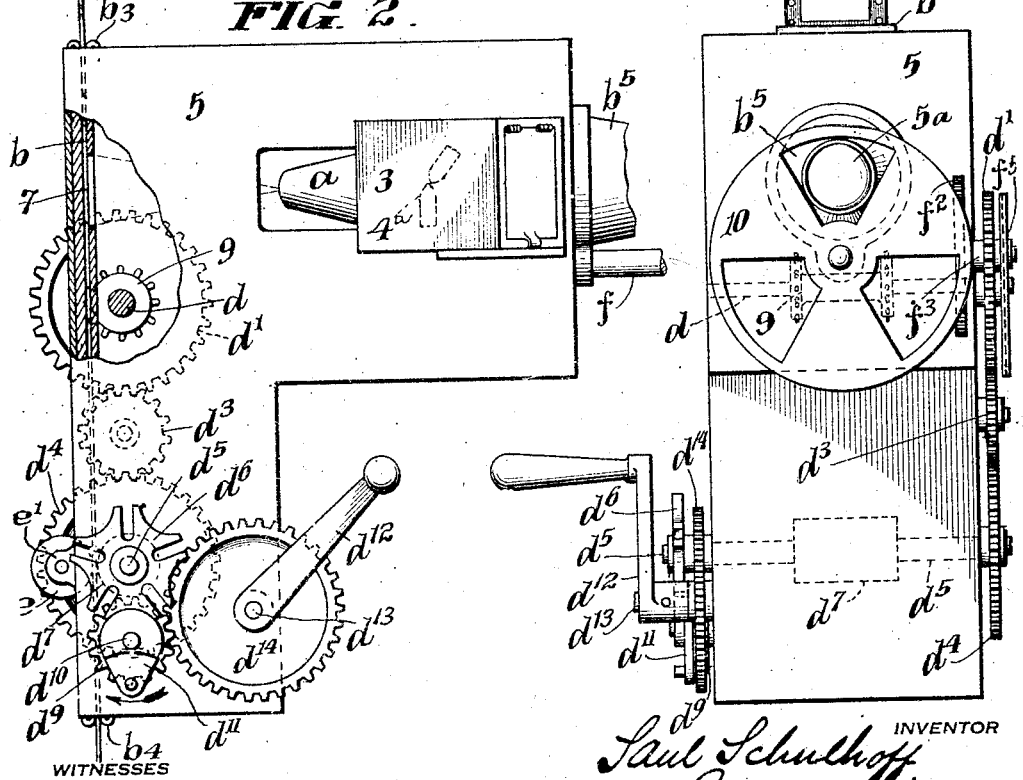

UNITED STATES PATENT OFFICE.

SAUL SCHULHOFF, OF PHILADELPHIA, PENNSYLVANIA.

PROJECTION APPARATUS.

1,070,992.  Specification of Letters Patent.  Patented Aug. 19, 1913.

Application filed February 20, 1912. Serial No. 678,765.

*To all whom it may concern:*

Be it known that I, SAUL SCHULHOFF, a citizen of the United States, residing at the city of Philadelphia, in the county of Philadelphia and State of Pennsylvania, have invented certain new and useful Improvements in Projection Apparatus, of which the following is a specification.

My invention relates to a projection apparatus in which the light generated by suitable illuminating means is presented to traveling objects whereof the images are projected directly upon a surface or screen external to the apparatus; and my invention further relates in connection with such an apparatus, to the employment therein of an opaque perforated band along the body of which objects are printed, in sequence, so as to appear in their proper relationship to each other on such band in order that when exhibited on a surface or screen, the illumined magnified images of which will be directly thrown in proper sequence relationship onto the said surface or screen.

My invention, generally stated, consists first, of an apparatus arranged so that a beam of light is presented directly at the exposed area of the objects of an opaque band in passage through a lens-house, the illumined images of which objects are projected by means of the direct reflected rays of said beam of light through the lens of said house directly onto a distant surface or screen; and second, of an adjustable apparatus arranged so that a beam of light is thrown upon the entire area of objects in sequence arrangement of an opaque band arranged to travel through a guide of the lens-house; and the said opaque band having the said objects thereon in positive sequence arranged relationship, and so that the images of which are projected by direct reflection of said rays of light through said lens, onto a distant surface or screen.

The nature and scope of my present invention will be more fully understood from the following description taken in connection with the accompanying drawings forming part hereof, in which—

Figure 1, is a top or plan view, partly in section, of a projection apparatus, embodying main features of my said invention. Fig. 2, is a side elevational view partly in broken section of the light-house and of the mechanism in connection with the lens-house, for feeding and controlling the feed of the opaque band therethrough; and Fig. 3, is a front elevational view of the lens-house and feed operating mechanism of the opaque band.

Referring to the drawings 3, is an arc lamp-house having extending therefrom preferably a cone-shaped light deflector tube $a$, in which the derived illumination from preferably, an arc-lamp $4^a$, is deflected through the said tube into the lens-house 5, having a vertical guide or way $b$, for an opaque edge perforated band 7, to travel, when impelled therethrough. The lamp-house 3, is pivotally supported at 4, from the outside of the lens-house 5, as shown in Fig. 1, so that thereby the said lamp-house may be quickly shifted, as desired, to change the direct reflection of the beam of light onto the traveling opaque strip of the house 5, which is required for desirable better effects on the distant screen. The guide or way $b$, is recessed at $b^1$ and $b^2$, as illustrated in Fig. 1, for a purpose to be presently described. The opaque band 7, along the body of the same is provided with objects printed, in sequence, so as to occupy proper relationship to each other along or throughout the same.

The lens-house 5, in the rear, at the top and bottom thereof, is arranged with either fixed or movable rolls $b^3$ and $b^4$, placed side by side in direct connection with the internal guide $b$, as clearly shown in Fig. 2, for aiding in the feeding uniformly of the band 7, to, through and from the guide or way $b$, of the house 5, by mechanism in a preferred form to be presently explained. The front wall of the house 5, is provided with an opening $b^5$, having a lens $5^a$, therein, through which lens opening the movable objects in sequence of the band 7, as clearly shown in Figs. 1 and 2, are exposed, and by reflected rays of the said beam of light 4, deflected directly through the said tube $a$, onto said objects so that the images of such movable objects of the said band 7, illumined and magnified in form, are thrown directly onto the distant screen or surface 8, as shown in Fig. 1.

9, is a double toothed feed-wheel located in rear of the lens-house 5, for engaging the edge perforations of the opaque band 7. This wheel is mounted on a cross-shaft $d$, journaled in the respective side walls of the house 5, and carrying on one extremity thereof, outside of the house 5, a gear $d^1$, and a sprocket $d^2$, and both being arranged stationary thereon. The gear $d^1$, meshes with an intermediate pinion $d^3$, and in turn with a gear $d^4$, journaled on one end of the shaft $d^5$, carrying on the opposite end a slitted star-wheel $d^6$, and on the same shaft $d^5$, interiorly of the house 5, as shown in Figs. 2 and 3, a friction roll $d^7$, is arranged complementally to a friction roll $e$, journaled to a bracket $e^1$, secured to the house and located outside of the same, Fig. 2, but said roll $e$, extending into the house and between which friction rolls $e$ and $d^7$, the opaque objective band 7, passes when fed between the same, and which rolls in action tend to hold the band 7, taut beyond the exposing point in the travel of said band through the guide or way $b$, and until leaving the house 5, and received on a lay-up reel or other suitable device therefor, not shown.

A shaft $d^{10}$, carries a pinion $d^9$, which meshes with a gear $d^{14}$. This shaft also carries a cam-shaped pin-wheel $d^{11}$, for periodically turning the star-wheel $d^6$, when a pin of this wheel $d^{11}$, rides in one of the series of slits of the wheel $d^6$, to intermittently or step-wise feed the band 7, vertically downward through the guide or way $b$, of the house 5, when the hand-crank $d^{12}$, is operated, mounted on a shaft $d^{13}$, carrying a gear $d^{14}$, which meshes with the pinion $d^9$, on the shaft $d^{10}$.

Beneath the lens-tube $b^5$, of the lens-house 5, is arranged a post $f$, to the extremity of which is movably connected a shutter 10, of any preferred type. This shutter is preferably provided with a peripheral rack $f^1$, which meshes with a pinion $f^2$, mounted on a shaft $f^3$, supported from a bracket $f^4$, secured to one side of the house 5. On the shaft $f^3$, at the outer extremity of the same, is mounted a sprocket-wheel $f^5$, carrying a chain $f^6$, connected also with the sprocket $d^2$, of the said shaft $d$.

By the foregoing arrangement of the operating mechanism of both shutter 10, and opaque band 7, respectively, timed exposure of the objects of the band 7, and step-wise feeding are effected by the influence of the direct rays of the beam of light 4, at the exposing point of the lens-tube $v^5$, and its reflection then direct of the magnified images accomplished on the distant screen or surface 8, by the aid of said lens $5^a$, and when the objects of the said opaque band 7, are arranged positively in respect to each other on the said band.

It will be observed in my invention as shown and described, that the beam of light thrown by the lamp 4, is directly against the objects on the guide $b$, and that such is reflected therefrom through the lens $5^a$, directly onto the distant screen 8, without the use of internal mirrors or the like in the house 5, thus simplifying the arrangement for deriving effective work therefrom.

Having thus described the nature and objects of my invention, what I claim as new and desire to secure by Letters Patent is:—

1. The combination of a lens-house having a vertical guide for a sequence printed opaque band adapted to be impelled through said guide, an adjustable lens-support located outside of said house and extending at an angle into the side of said house, a light emitting body arranged in rear thereof, said lens adapted to concentrate the beam of light directly onto the vertically moving opaque band so that images thereof are directly reflected through the front lens opening of said house onto a distant screen and means to feed step by step and thereby to control the positive movement of said band, substantially as and for the purposes described.

2. The combination of a lens-house having a vertical guide for a sequence printed opaque band adapted to be impelled through said guide, an adjustable lens-support located outside of said house and extending at an angle into the side of said house, a light emitting body arranged in rear thereof, said lens adapted to concentrate the beam of light to be thrown directly onto the vertically moving opaque band so that the images thereof are directly reflected through the front lens opening of said house onto a distant screen, a perforated shutter arranged in advance of the lens opening of said lens-house and means connected with said house to feed step by step and to control thereby the travel of said opaque band and to simultaneously therewith cause rotary movement of said shutter, substantially as and for the purposes described.

In witness whereof, I have hereunto set my signature in the presence of the two subscribing witnesses hereto.

SAUL SCHULHOFF.

Witnesses:
J. WALTER DOUGLASS,
THOMAS M. SMITH.